INVENTOR
ROY M. EMANUELSON
ROBERT D. CRAM
BY Francis J. Thornton
ATTORNEY

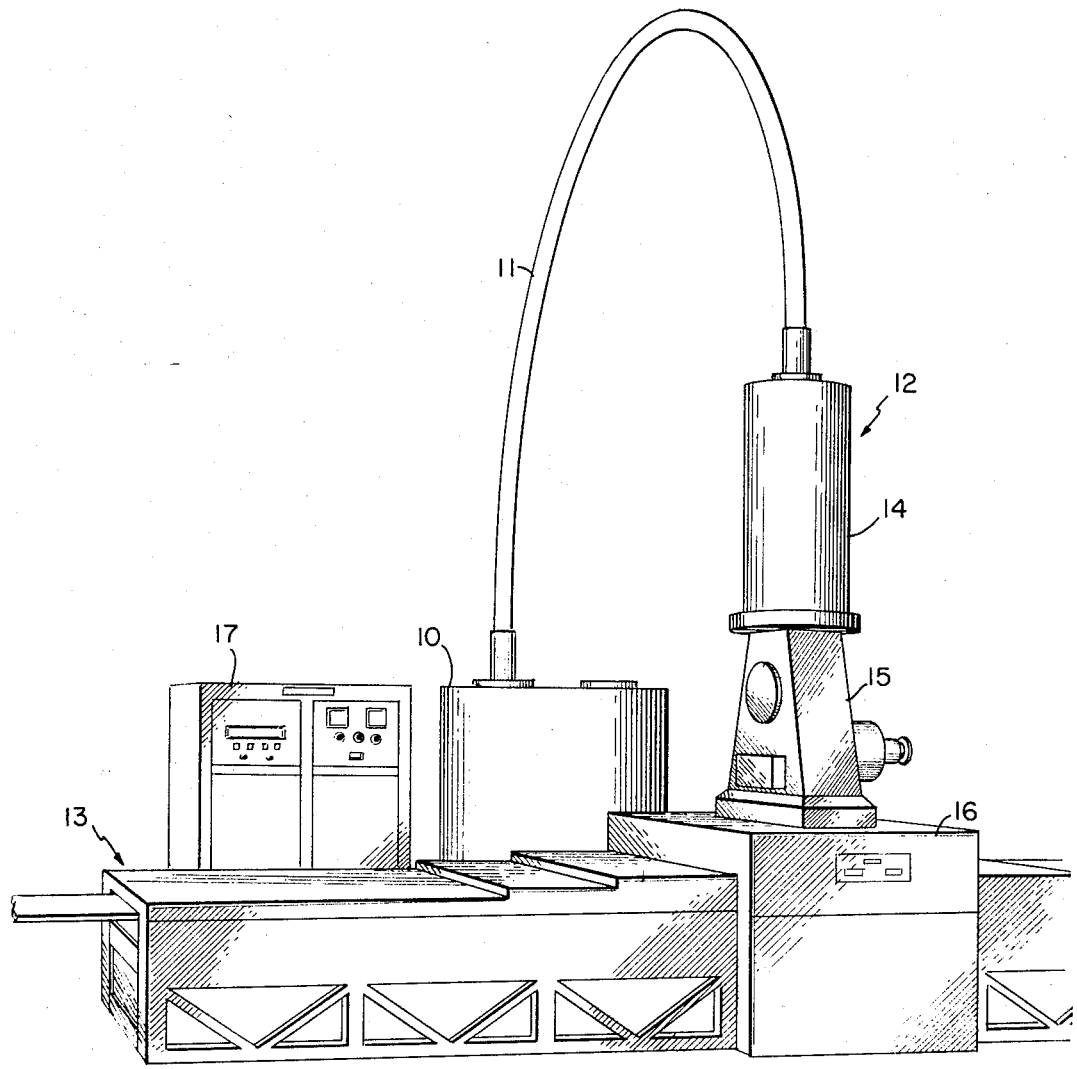
FIG. I
INVENTOR
ROY M. EMANUELSON
ROBERT D. CRAM
BY Francis J. Thornton
ATTORNEY

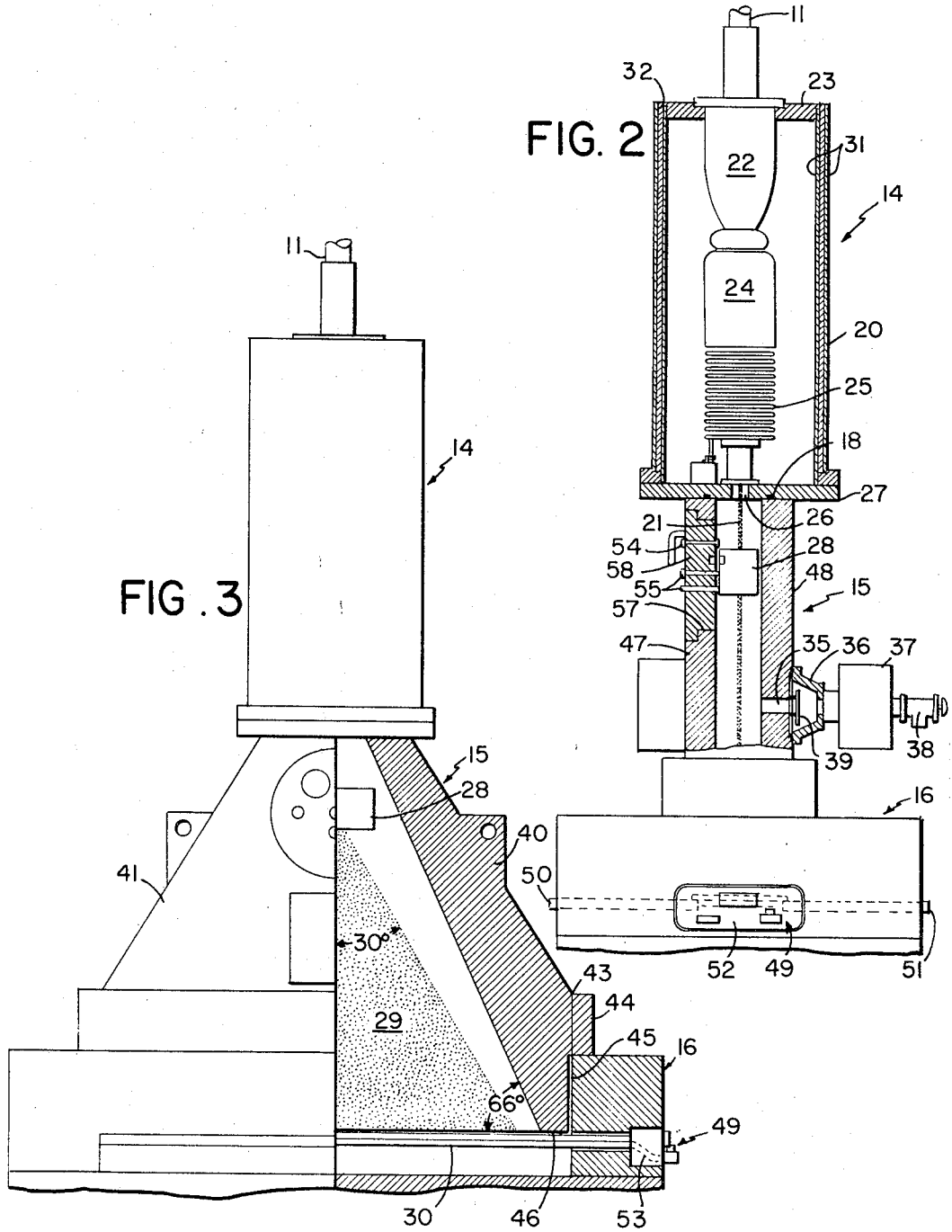

March 18, 1969 R. M. EMANUELSON ET AL 3,433,947
ELECTRON BEAM ACCELERATOR WITH SHIELDING
MEANS AND ELECTRON BEAM INTERLOCKED
Filed June 2, 1966 Sheet 4 of 7
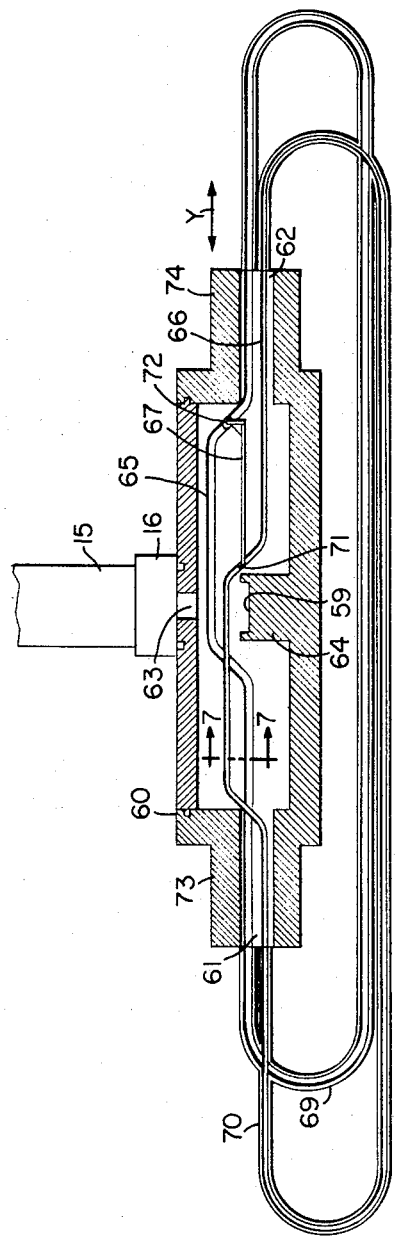
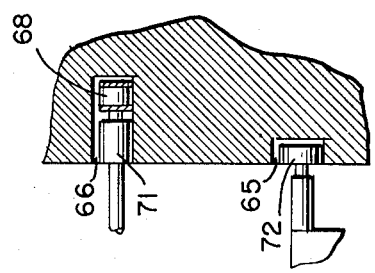
INVENTOR
ROY M. EMANUELSON
ROBERT D. CRAM
BY Francis J. Thornton
ATTORNEY

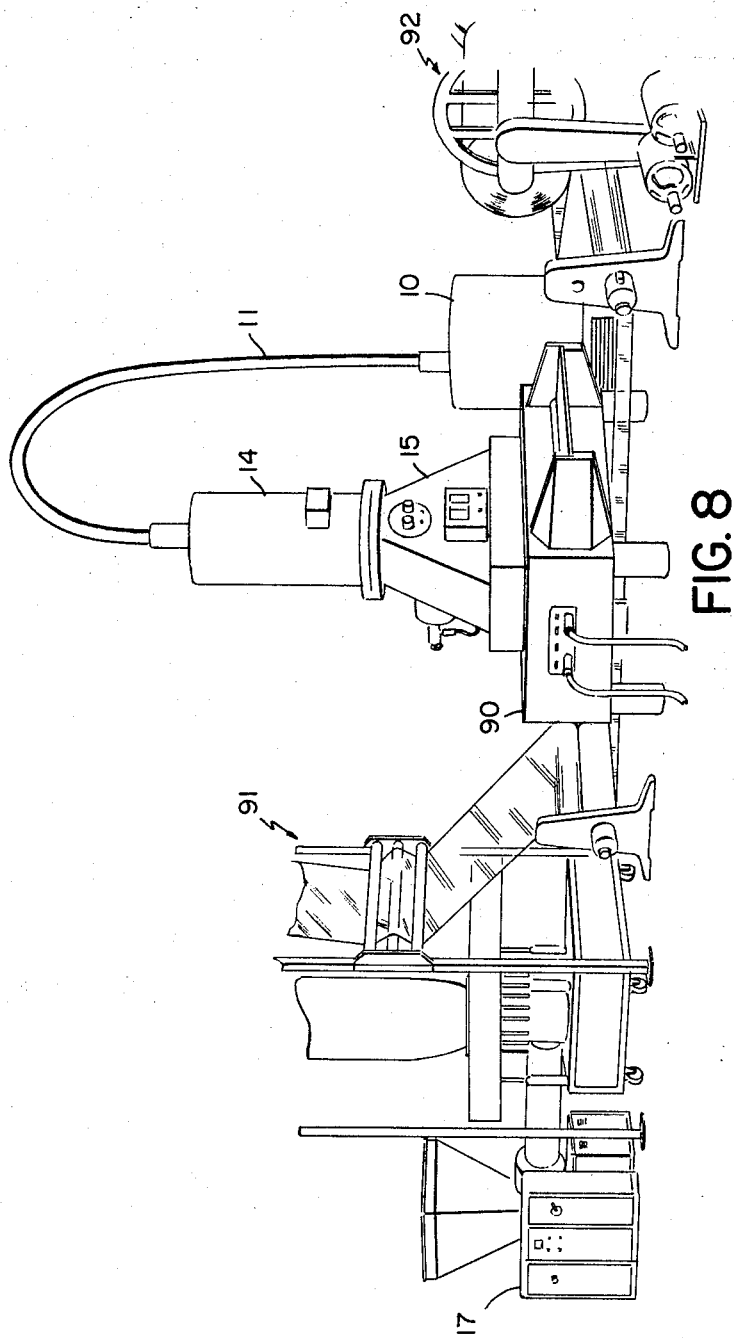

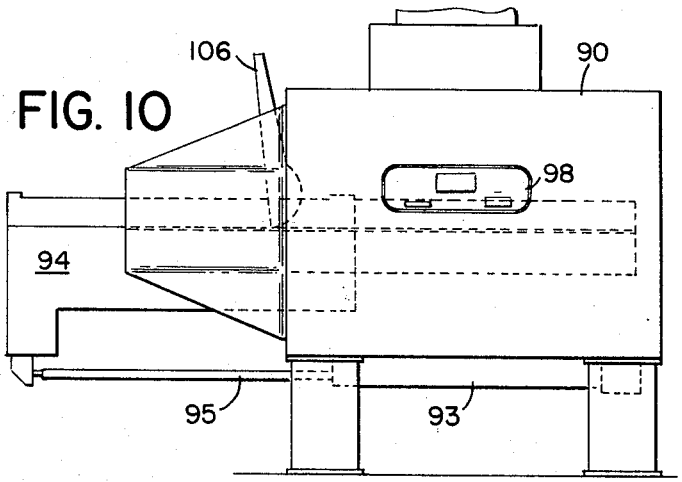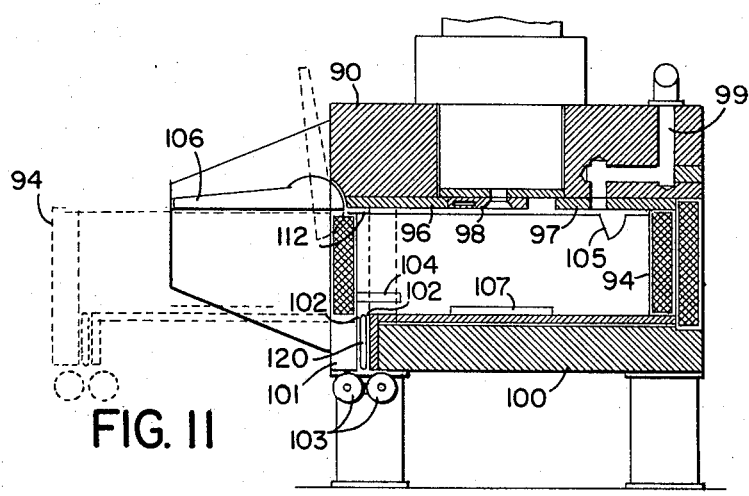

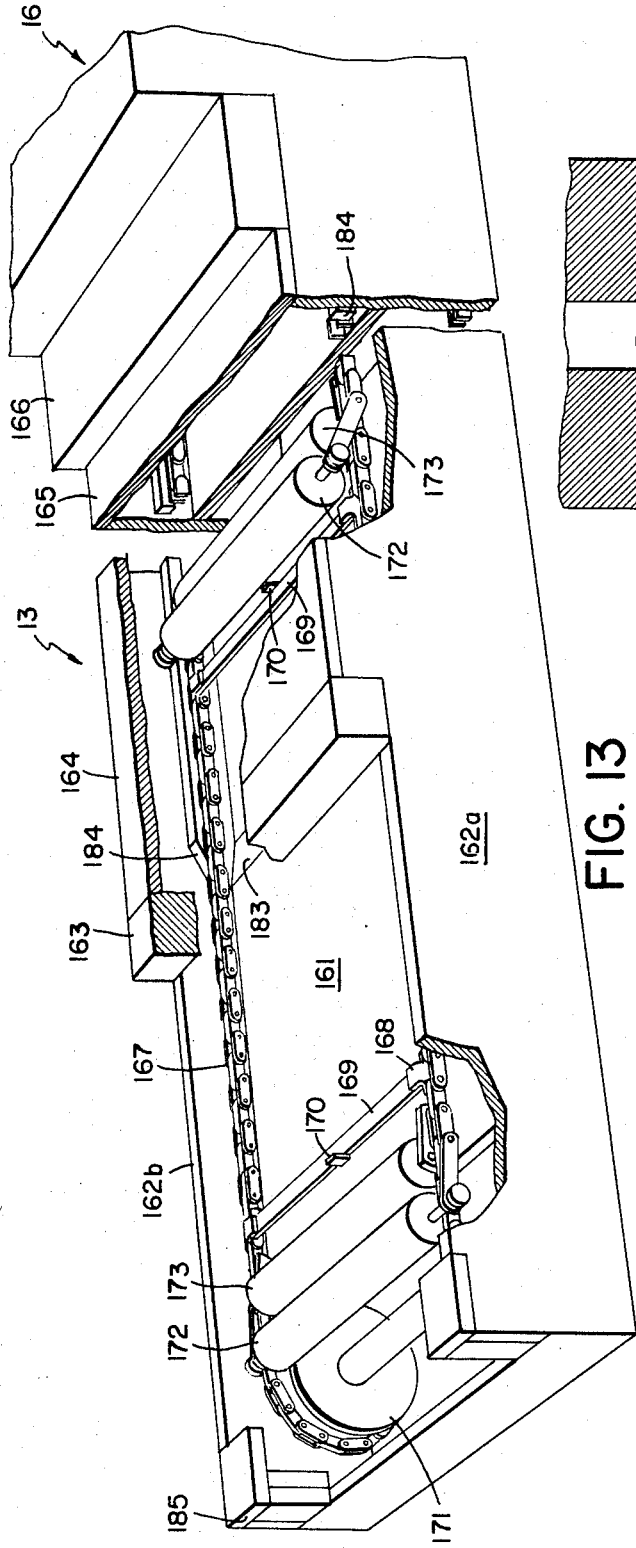
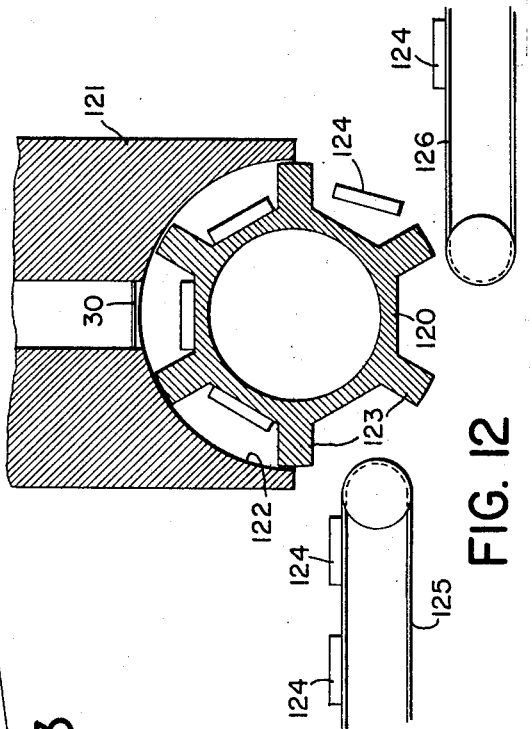
FIG. 12
FIG. 13
INVENTOR
ROY M. EMANUELSON
ROBERT D. CRAM
BY *Francis J. Thornton*
ATTORNEY United States Patent Office 3,433,947
Patented Mar. 18, 1969

3,433,947
ELECTRON BEAM ACCELERATOR WITH SHIELDING MEANS AND ELECTRON BEAM INTERLOCKED
Roy M. Emanuelson, Reading, and Robert D. Cram, Ipswich, Mass., assignors to High Voltage Engineering Corporation, Burlington, Mass., a corporation of Massachusetts
Filed June 2, 1966, Ser. No. 561,306
U.S. Cl. 250—49.5     9 Claims
Int. Cl. H01j 37/26

ABSTRACT OF THE DISCLOSURE

An apparatus for the electron irradiation of goods comprising an electron beam generator-accelerator, for creating a highly energetic electron beam, which has shielding integral with the walls thereof of sufficient thickness and density to attenuate X-rays generated therein, by the electron bombardment of the goods, to below 2–5 millirads per hour, which shielding cannot be removed wtihout causing stoppage of the electron beam.

---

The present invention relates in general to the irradiation of matter with high energy electrons and in particular to an apparatus for delivering the beam of high energy electrons to the matter being irradiated.

Traditionally, cross-linking of plastic coatings, material sterilization, and food preservation have been accomplished by using either chemical techniques or heat. Both of these methods or a combination of the two require relatively lengthy periods.

The same results can be accomplished almost instantaneously by irradiation with high energy electron beams. The use of such beams reduces the time required to such a degree that considerably significant savings in production costs can be realized.

Such electron processing has not, to date, found wide acceptance. One reason for such nonacceptance is because of the potential hazards from radiation which operating personnel could encounter. In the instances where radiation processing is deemed desirable, large radiation proof vaults surrounding the equipment are required to achieve proper personnel protection. Furthermore, expensive automatic equipment is required to eliminate direct contact with the equipment. Still further, an elaborate electrical interlock system is required to prevent inadvertent operation of the equipment during repairs.

All these requirements add to the initial capital investment such that the economic benefit becomes marginal. Additionally, the interlock system can be deliberately circumvented or otherwise avoided.

The present invention was conceived and built in order to avoid the above described difficulties and drawbacks encountered in the use of prior art electron beam processing equipment.

In particular, the present invention is such that expensive exterior vaulting is not required. Also, the complexity of the automatic equipment necessary is greatly reduced or eliminated entirely. Still further, the present invention provides the means whereby electron processing machines can be made without the use of defeatible interlocks and yet eliminate the radiation hazard found in prior art devices.

Broadly speaking, the present invention achieves these advantages and others through the use of adequate radiation shielding made integral with the electron accelerator and its associated apparatus.

The integral shielding of the present invention permits electron beam processing equipment to be used in situations heretofore thought impossible because of radiation hazards, location, space requirements, or expense. The present invention accomplishes these advantages while eliminating the need of expensive and massive radiation proof vaults. Additionally, the invention permits the ready loading and unloading of the machine without danger from radiation.

Still further, the present invention provides a fail-safe electron accelerator which immediately and automatically shuts down with the removal of any safety feature which would permit the occurrence of a radiation hazard.

These and other features and advantages will become more apparent and more fully appreciated after a perusal of the accompanying description taken in conjunction with the accompanying drawings in which:

FIGURE 1 shows an overall view of one embodiment of the present invention;

FIGURE 2 shows a side sectional view of the accelerator apparatus of FIGURE 1;

FIGURE 3 shows a front quarter section of the accelerator apparatus of FIGURE 1;

FIGURE 6 shows a cross-sectional schematic view of one embodiment of the conveyor system of FIGURE 1;

FIGURE 7 shows the track and bearing detail of the conveyor shown in FIGURE 6;

FIGURE 8 shows an overall view of a second embodiment of the invention;

FIGURE 9 shows a front view of the embodiment shown in FIGURE 8;

FIGURE 10 shows a side view of the embodiment shown in FIGURE 8 with the front in open position;

FIGURE 11 shows a sectional side view of the embodiment of FIGURE 8;

FIGURE 12 shows a third embodiment of the invention;

FIGURE 13 shows a different embodiment of the conveyor system of FIGURE 1;

Figure 4A:
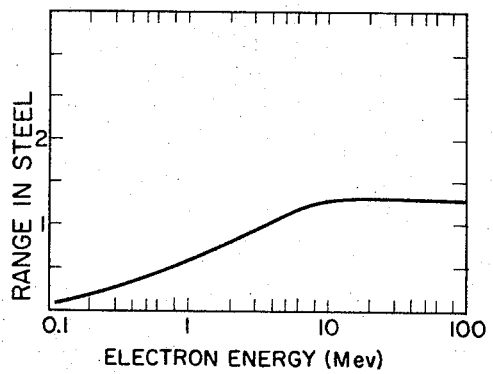
FIGURE 4a is a graph of electron energy vs. range in steel.

With reference now to the drawings and, more particularly, to FIGURE 1, there is shown an overall view of one model of an integrally shielded electron beam processing equipment used for the curing of plastic or plastic coated articles of manufacture.

In this view there is shown a high voltage D.C. power supply 10 connected by a cable 11 to an integrally shielded electron beam assembly 12 mounted on an integrally shielded conveyor assembly 13. With control panel 17 the equipment appears in this view as it is used on a factory production floor.

Preferably the power supply 10 is of the insulating-core transformer type as shown in Dr. Robert J. Van de Graaff's patent, Number 3, 187,208, dated June 1, 1965. Basically this supply is a three-phase transformer-rectifier with multiple secondary cores for each phase.

The power produced by supply 10 is delivered to the accelerator assembly 12 by a flexible coaxial cable 11 whose length is adjustable so that the supply may be placed at any desired position with relation to the remainder oft he equipment. The console 17 may also be situated in any convenient place and will be connected to the other necessary assemblies by cabling (not shown).

Turning now to FIGURES 2 and 3, the electron beam assembly 12 will be discussed in greater detail. The assembly 12 comprises an accelerator subassembly 14, a shielded scanner chamber 15 and a base shield 16.

The accelerator subassembly 14, in turn, comprises a cylindrical tank 20 within which there is contained a bushing 22 which passes through the distal end 23 of tank 20 and electrically couples cable 11 to an accelerator terminal shell 24 which contains within it a transformer and a cathode (not shown). The cathode provides a supply of electrons which are electrostatically focused into a stream by suitable means, not shown, and accelerated by the multiple electrode accelerator column 25 located directly below the shell 24. The accelerated electrons pass in the form of a beam 21 out opening 26, provided in the proximal end 27, of tank 20, into the shielded scanner chamber 15. Directly after entering chamber 15, the beam 21 passes into an electromagnetic scanner 28 which continuously sweeps the beam 21 from side to side to form a wide, elongated, fan-line pattern 29. The widened beam passes out of chamber 15 via a thin metal foil window 30 located within the base shield 16.

Such highly accelerated electrons are potentially hazardous to human life not only in themselves but especially because of the harmful X-rays produced when such electrons strike solid matter. The present invention contains these harmful radiations by providing the entire assembly with integral shielding which cannot be removed without causing shut-down of the electron source and hence of all radiation.

The present invention will first be described in reference to the embodiment shown in FIGURE 1. For purposes of illustration only, it will be assumed that a twenty milliampere electron beam will be accelerated to a maximum of 500 kilovolts and scanned 30° on either side of the beam centerline.

Since the electrons become hazardous or produce harmful radiation only after they are accelerated, the shielding disposed about the terminal shell need not have the impedance required of the shielding made integral with the scanning chamber. Thus tank 20 is made in the shape of a double-walled steel cylinder, formed of ¼ inch steel sheets 31, separated by a 1 inch thick filling of lead 32, and having upper and lower ends 23 and 27 respectively formed from 2 inch thick steel plate. End 23 is in the form of a flat annular ring welded to the inner wall of the cylinder 20 and has the terminal bushing 22 passing therethrough. The lower tank end 27 is a large circular disc which is welded to both walls of the tank 20. This disc is provided with a central orifice 26 which is aligned with and sealed off by column 25. Thus there is formed a strong pressurizable tank which is operation is filled with 100 p.s.i. insulating gas. When electrons are generated at the cathode, they are accelerated by the field in column 25 and pass through orifice 26 as an electron beam 21 into scanner 28.

After the accelerated electrons pass through scanner 28 into chamber 15, they strike the window 30 and most pass therethrough into the material to be irradiated which is being carried beneath the beam on the conveyor system 13. Some electrons however upon striking the window, the material being processed, or the underlying conveyor bed produce X-rays which emanate, from the struck material, at various angles. These potentially harmful radiations must not be permitted to pass out of the apparatus unless reduced to a safe level. To this end, the walls of chamber 15 and base shield 16 are made to attenuate the harmful X-radiations and reduce them to safe levels, that is below 2.5 millirads per hour.

Figure 4B:
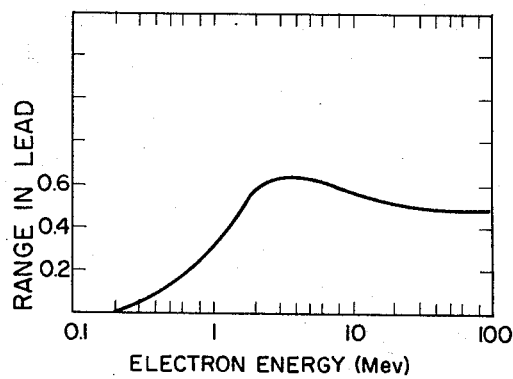
FIGURE 4b is a graph of electron energy vs. range in lead.

In order to properly design the walls of chamber 15 it is necessary to call to mind that the penetrating ability, or range, of such X-radiation generally increases with the energy of the radiation and decreases with the density of the material being struck. This relationship is shown graphically in FIGURES 4A and 4B. By expressing the range in terms of half value layers, the energy in terms of the generating electron, and using the general absorption equation.

$$I = I_0 e^{-ux}$$

any worker, skilled in the art, can determine the wall thickness necessary to attenuate the generated X-rays below 2.5 millirads/hour. It should be understood, however, that since the X-ray energy and density generally increases with electron beam energy and current, the thicknesses given in the specific embodiments described herein are illustrative only for a 500 kev. 20 milliampere beam and that for larger beams thicker walls would be required. Conversely, with smaller beams thinner walls could be utilized.

Figure 5:
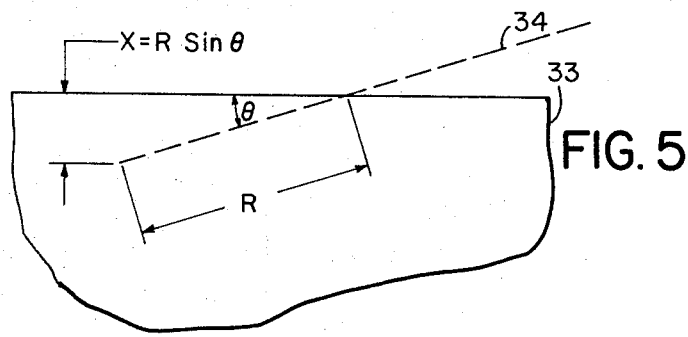
FIGURE 5 shows the effect of incident angle of electrons.

As is well known, the penetration depth taken normal to the surface is dependent on the incident angle of the radiation with respect to the surface being struck. In other words the point at which the radiation is attenuated to a safe level is determined by the angle at which it strikes the surface. This may be better understood from FIGURE 5. In this figure the path of an incident ray of radiation striking a surface 33 is shown by the dotted line 34. X is the distance from the surface at which the ray is attenuated to a safe level when R is the range of the radiation when it has an initial energy E and $\theta$ is the angle of the incident beam with respect to the surface 33. Thus under these circumstances $$X = R_E \sin \theta$$

With this information one may readily calculate the necessary impedance in terms of the thickness required for the chamber walls.

For ease of fabrication slabs of mild steel was selected for the walls of chamber 15. These slabs were welded together such that a vacuum could be maintained in the chamber. The general shape of chamber 15 resembles the center zone of a truncated pyramid as shown in FIGURES 2 and 3. The configuration shown in these views was chosen to provide sufficient width for a 60° beam and fort the scanner 28 while matching the upper surface of the chamber to the tank 20 for vacuum purposes. Thus the inner surface of the sidewalls 40 and 41 of chamber 15 were inclined at an angle of 66° to the horizontal. Since radiation intensity is inversely proportional to the square of the distance from the source and since with increasing $\theta$ the distance X becomes smaller, the chamber walls 40 and 41 can be made thinner as they recede from the window 30. Thinning these walls at their upper points realizes a considerable savings in both weight and cost of material.

To obtain proper matching between the chamber and the tank and yet retain a sufficient thickness for protection against radiation leakage, the outer surface of the walls 40 and 41 were tapered at an angle of 50° to the horizontal. In the actual machine, built in accordance with the invention, the walls 40 and 41 were each 7 inches thick at their top and 13 inches thick at their widest point 43. In order to properly align the chamber in the base shield 16, and yet retain sufficient shielding, the outer surface of the chamber walls 40 and 41 were cut on a vertical line from point 43 to the bottom and an eight inch high square ring 44 of 3 inch thick steel was welded around the chamber. This ring 44 is provided with holes (not shown) through which guide pins mounted on base 16 pass. The ring further shields the clearance space 45 provided between the chamber 15 and the base shield 16.

Since the angle of incidence of any radiation directed towards the front and back walls 47 and 48 will be very low in any region higher than ring 44, these walls need not exceed 4 inches in thickness.

Ring 44 does not transmit the weight of the unit to the base shield 16. Instead the entire weight of the chamber 15 and accelerator 14 is transmitted through the window assembly 49 to a pair of support plates 50 and 51 which are located in the base shield 16. Located between the bottom of chamber 15 and the window assembly 49 is gasket 46 of suitably deformable material such as Indium, which makes this joint vacuum tight.

The base shield 16 also has a substantially square ring configuration. In detail, for the described apparatus, the shield has a height of 16 inches and a wall thickness of 12 inches.

Because the window assembly 49 must be made to pass through an opening in the base shield, adequate protection must be afforded at this opening. This is accomplished by providing the window assembly with a bearing plate 52 made of 4 inch thick lead. In order to provide air cooling of the window 30 an air duct 53 (shown in phantom) passes in a simple labyrinth fashion through the bearing plate 52 and along an entire side of the window 30.

As is well known in the art it is necessary that a vacuum be maintained in the device between the cathode and the window. To this end suitable vacuum tight seals have been provided at the various assembly joints and means provided in the back wall 48 of the chamber 15 for evacuating this region. These means consist of a port 35 provided in the rear wall, a vacuum flange 36 around the port, an ion pump 37 and a vacuum valve 38 for coupling on a roughing pump (not shown). To prevent any possible stray radiation from passing out of the port 35, a baffle plate 39 of 1" lead is provided in front of ion pump 37.

The forward wall 47 is also provided with a port 57 through which the scanner 28 can pass. This port 57 is sealed with a plug 58 of the same thickness as the wall 47. A plurality of electrical feed through connectors 54 and screw means 55 for adjusting the scanner pass through this plug.

This completes the description of the detail of the scanning chamber 15, the base shield 16 and the accelerator assembly 14. However, as indicated in FIG. 1 integrally shielded material moving means, such as conveyor 13, must be provided in order to pass the material beneath the beam. Several different material moving devices are illustrated in FIGURES 6 through 13.

Turning first to FIGURES 6 and 7, one embodiment of a conveyor system suitable for use with this invention will be described. The embodiment under discussion is especially designed to handle large rigid sheets, such as plywood panels, coated with a radiation curable plastic coating, which cannot be tilted until cured by passage under the electron beam.

The system shown in these figures has its critical portion encased in an integrally shielded housing 60 made in the form of a hollow box. The housing 60 is deployed beneath the base shield 16 and scanner 15 such that all of the beam enters the interior of housing 60 through a slit 63 provided in its upper surface. The housing 60 further is provided with end walls 73 and 74 having slots 61 and 62 respectively, provided therein. These slots 61 and 62 of a height and width suitable to accommodate a conveyor platform 67 and the material being processed.

The housing is mechanically interlocked to base shield 16 such that access cannot be had to its interior until the base shield 16 is first removed and, of course, the base shield 16 is mechanically interlocked to scanner 15 such that it cannot be removed until the scanner 15 is first removed. Removal of the scanner 15 will, of course, automatically extinguish the beam since its removal disrupts the vacuum in chamber 15 permitting air to contact the cathode which instantly becomes consumed in air.

Disposed directly below the slit 63 and in line with the beam path is a pedestal 64 whose upper surface is recessed in to form a trough 59. The bottom of this trough 59 is made higher than the end slots 61 and 62. The end walls 73 and 74 are made such that the slots become elongated in the longitudinal direction Y of the conveyor. By making this length of the slots as long as possible while keeping their height as small as possible and placing the slots 61 and 62 below the level of surface 59, any radiation entering these slots will do so at an angle. Radiation so striking the slot walls will either pass through and be attenuated or else be reflected a number of times and also be attenuated, for X-rays when so reflected reduce in energy by a factor of a thousand with each reflection. The necessary dimensions for these slots and end walls is determined by beam energy and by the size of material being processed and can be readily calculated.

Disposed on each side wall is a pair of tracks 65 and 66 adapted to receive the wheels 72 and 71 of a movable platform 67. These tracks are laid out such that the platform 67 always has the same surface facing upwards thus imparting to the platform both a conveyor action and an elevator action. These tracks also are adapted to raise the platform over the pedestal 64 to assure that any radiation created, when the beam strikes either the platform or the material being processed, will be higher than the end slots and upon entering the slots will be reflected and attenuated.

Motive power is supplied to the platform 67 by a chain 68 which is laid in channel 66. This chain is rotably coupled to the leading wheel 71 of the platform.

Since it is necessary that these tracks cross one another it is necessary that means be provided to prevent the follower wheel 72 from engaging the wrong track at the crossover point. This is accomplished by making track 66 narrow with respect to follower wheel 72 as shown in FIG. 7. In other words, follower wheel 72 should be so wide that it cannot enter track 66. It is, of course, necessary that track 66 be deep enough so as to accommodate chain 68.

U-shaped channels 69 and 70 are provided at the outside of the housing to assure that the platform follows its prescribed path. These channels, of course, have the same dimensions as tracks 65 and 66 respectively and are arranged such that the platform will always travel with the same surface facing upwards.

As previously mentioned apparatus built in accordance with the present invention is safe for use without a vault. The vault is eliminated because of the integral shielding of the accelerator tank and the scanning chamber together with the unique manipulation of the material being processed such that radiation is prevented from leaking from the unit.

Furthermore the mechanical interlocking is such that if one attempted to remove the tank from the chamber or to remove the chamber from the base shield without first shutting down the beam, they would upon removal of any portion disrupt the vacuum permitting air to contact the cathode. Since the cathode is primarily a hot wire, it would immediately burn up and be extinguished. Furthermore, since the entire weight of the chamber and tank, about 12,000 pounds, is carried by the window assembly, the window cannot be removed without first removing the tank and the chamber. Thus none of the safety features can be removed without causing automatic extinction of the beam. Similarly, the conveyor chute is made long enough to attenuate the electrons in line with the slots and small enough such that a man cannot enter it without first removing the scanner chamber which automatically disrupts the beam. Furthermore, the possibility of someone becoming trapped in a vault while the equipment is operating is totally eliminated.

A second embodiment of this integrated shielding concept is shown in FIGURE 8 which portrays a machine built for the processing of flexible material such as sheet polyethylene. In this embodiment the power supply 10, the cable 11, accelerator assembly 14, the integrally shielded chamber 15 and the cathode 17 are identical to those shown and described in conjunction with FIGURE 1. The device, however, differs from that of FIGURE 1 by substitution of a modified base shield 90 which is especially adapted for processing flexible material such as sheet film. A source of sheet film such as producing tower 91 is positioned in-line with the radiation facility and as this film is fed from the tower, it passes into the base shield 90. In the base shield 90 is positioned a festooning arrangement (not shown) over which the film passes for irradiation after which it is removed from the base shield 90 and wound by a rewinder 92.

Since the rewinder 92, film producing tower 91 and festooning apparatus used in the drawer are well known to the prior art, they will not be described in detail. However, since the modified base shield 90 does form an important part of this embodiment of the present invention, its novel features and unique aspects will be discussed in conjunction with FIGURES 9, 10 and 11.

Base shield 90 is in the form of a large steel cabinet in which a drawer 94 is slidably mounted on gliders and a pair of screw actuated drive rods 95 are located beneath the drawer and run in channels 93. The drawer 94 is in the general shape of an open box whose front and rear walls are in the form of a steel-lead sandwich.

The base shield 90 has maintained in the center thereof, on a pair of support plates 96 and 97, a window assembly 98 which is forced against the support plates by the weight of the scanning chamber and accelerator tank. The base shield is further provided with a labyrinth gas disposal system 99. The lower plate 100 of base 90 is recessed so that the front wall 101 of the drawer, when closed, will be flush with the front of the base shield and yet there will be provided slits 102 in the bottom of the drawer through which the material may pass. Located directly below the front wall of the drawer are as brackets 92 which support rollers 103.

Directly above the slits 102 and the rollers 103 and mounted on the front wall 101 of the drawer is a shelf 104 which shields the slits 102 from X-rays. Positioned between the slits 102 is a magnetic electron trap 120 which will prevent an electron from passing through the slits. Each side wall has a notch 105 therein into which the cover plate 106 will fit, when the drawer is in its open position. If desired, a water cooled target 107 may be situated on the bottom of the drawer so that it is directly below the window assembly when the drawer is closed.

In order to provide adequate protection to the operator when the drawer is in the open position, the rear wall 108 is also formed of a steel lead sandwich which fully seals the opening and acts as a shield between the source and the operator if the drawer is opened while the machine is operating. To further protect the operator under these circumstances the front of the base shield 90 is provided with drawer shrouds 110 and 111 on either side of the drawer opening and with the cover plate 106 which cannot be opened until aligned with the notches 105 provided in the side walls of the drawer.

Both the shrouds 110 and 111 and the cover 106 are made of such a length and thickness of material that they protect the operator from X-rays until the rear wall of the drawer covers the window or is interposed between the window and the operator.

A steel plate 112 is secured to the support 96 so as to prevent the drawer from being totally removed from the opening. This plate 112 also acts as a shield for radiation that passes in a direct line over the top of either the front or back drawer walls.

Turning now to FIGURE 12, there is shown a third embodiment of the present invention. In this embodiment the drawer is replaced with a circular turret 120 which is rotatably supported between the base shield 121 which is formed on its lower portion with a semicircular recess 122 capable of receiving the turret 120. The turret is itself provided with a plurality of paddle arms 123 which receive and push up packages 124 to be irradiated from a conveyor or other delivery system 125 as the turret rotates. Rotation of the turret delivers the packages to a position below the window where they are irradiated and finally delivers them to a second system such as conveyor 126 which takes away the irradiated packages.

By closely matching the turret 120 to the recess 122 electrons are prevented from escaping and radiation is attenuated by the thickness of interposed material and the labyrinth effect of the curved space between the recess walls and paddle arms.

Figure 14:
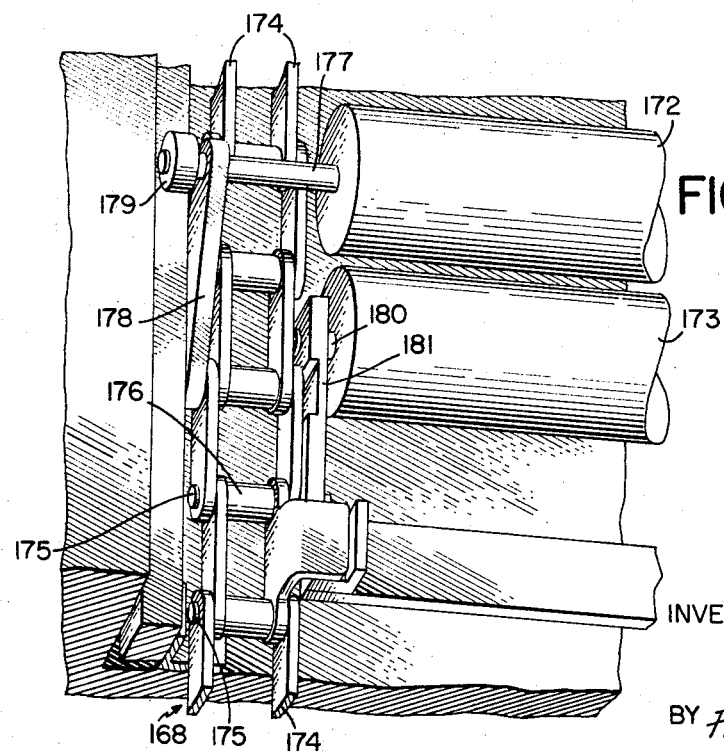
FIGURE 14 shows in detail the roller linkage used in the conveyor shown in FIGURE 13.

With reference now to FIGURES 13 and 14 another unique embodiment of the conveyor system 13 will be described. Basically this system is a level chute which consists of a bed 161 upon which there is mounted walls 162a and 162b. The chute is covered for a distance of about 10 feet from the base plate 16 by a plurality of plates 163, 164, 165 and 166. Along each side of the bed 161 there is provided continuous roller chains 167 and 168 coupled together by a plurality of slats 169. The number of slats required depends on the length and rigidity of the material being processed. For example, if it is assumed that the material is a 4 x 8 foot sheet of plywood, slats every two feet are quite adequate. With such material the end slats are preferably provided with stops 170 to prevent shifting of the plywood sheet. The chains 167 and 168 are each driven by synchronized motor driven sprockets 171 of which only one is shown. Every eight feet there is provided a pair of 2 inch lead filled steel rollers 172 and 173.

With reference now to FIGURE 14 some unique features of these rollers and the linkage used to couple the rollers to the chains will be described. For the sake of simplicity only one end of the roller pair and one chain is shown. The chain 168 is composed of a plurality of side plates 174 held together by pins 175 and separated by bushings 176. Thus the chain is similar in appearance to the ordinary bicycle chain.

Roller 172 has extending along the axis and over the chain 168 a shaft 177 to which there is rotatably coupled, on the outside of the chain, a connector link 178. On the outside of the link 178 on shaft 177 is rotatably mounted a ball bearing raceway 179 shaped in the form of a wheel. Roller 173 is made slightly shorter than roller 172 in order to provide room for a short shaft 180 and a connecting link 181 rotatably coupled to the shaft 180 and to the chain 168.

Referring once again to FIGURE 13 the function of these rollers will be described in greater detail. As the rollers are pulled by the moving chains along the bed of the conveyor chute, they pass under with minimum clearance, say in the order of $\frac{1}{16}$ of an inch, the plate 163 which is made substantially thicker than the succeeding plate 164. Once the rollers clear this overhanging tip, the leading roller 173 rolls down a ramp 183 about ½ inch high to a lower level 161a of the chute bed. This freedom of movement is permitted roller 173 because of the linkage 181. Simultaneously the roller bearing wheels 179 provided on the ends of the trailing roller 172 engage track 184 positioned on the chute side walls 162a and 162b. These tracks each has an upwardly rising leading edge which causes the trailing roller 172 to be raised in the air above the bed of the chute. When the roller 172 is raised, a minimum clearance space is left between it and the cover plates 164, 165, and 166 of the chute and any radiation passing through this clearance space is attenuated by the overhanging lip formed by the cover plate 163. In the center of the chute the two rollers overlap and thus block the radiation in this region. Any extraneous radiation that might be traveling along the top of the chains is blocked by L shaped shields 185 which overhang the chains and the sprockets.

The distance between the roller pairs is determined by the length of the material being processed and the requirement that there should always be at least one pair of rollers between the window 130 and the overhanging tip of cover plate 163.

If desired, the cover plate 165 can be made removable so that access can be had to the interior of the chute. If this plate is made removable, it may be mechanically interlocked so that the scanning chamber 15 must be removed together with the base shield 16 before this plate can be removed. Furthermore electrical interlocks can also be coupled thereto so that the beam is stopped instantaneously upon its removal.

Having now described several embodiments of the present invention, and since other embodiments, improvements and modifications will now become apparent to those skilled in the art, it is desired that the present invention be limited only by the following claims.

What is claimed is:

1. An apparatus for electron irradiation of goods comprising an enclosed, evacuated chamber having affixed thereto means for producing a beam of electrons with energies in the kev. range or greater, along an axis of said chamber, scanner means, in said chamber, for expanding said beam to form an elongated fan-like configuration, a beam emitting window means comprising an elongated narrow pane element positioned in a wall of said chamber transverse to said beam to permit transmittal of said beam out of said chamber, and transport means, positioned in line with said chamber, to convey goods, to be irradiated, transversely through said beam after said beam passes through said window, each of said means having integral shielding therewith of sufficient density and thickness to attenuate X-rays created in said means to a level below 2.5 millirads per hour, each of said means being interlocked whereby removal of any of said means interrupts said beam, said transport means comprising a conveyor bearing movable mechanical obstructions positioned to permit said goods to pass through said transport means, under said beam, while blocking the passage of a human or his extremities, each of said obstructions comprising a pair of in-line lead filled steel rollers, said rollers being coupled to said transport means, said tracks being arranged in said transport means to permit the leading roller to drop down and the following roller to raise up to impede electrons and attenuate X-rays traveling parallel to said transport means.

2. The apparatus of claim 1 wherein said transport means comprise an elongated housing, conveyor means disposed in said housing, and at least one movable platform engagable with said conveyor means, said housing having a slot therein whereby said beam may enter said housing, a pedestal disposed beneath said slot, a cupped depression to said pedestal under said beams, and elongated lips provided at each end of said housing, perpendicular to said beam, said conveyor means adapted to convey said platform through said lips and over said pedestal.

3. The apparatus of claim 2 wherein said conveyor means comprises two sets of tracks adapted to convey said platform along a predetermined path through said lips and over said pedestal, each set of said tracks forming a closed loop and being of different size and geometrical configuration, said platform having two pairs of wheels provided thereon, one of said pairs adapted to engage only one of said sets of tracks and the other of said pair of wheels adapted to engage only the other set of tracks, one of said sets of tracks having a movable chain therein, said chain engaging one of said pair of wheels whereby said platform is propelled through said transport means.

4. The apparatus of claim 2 wherein said lips are of a width and length to attenuate X-rays by multiple reflections.

5. The apparatus of claim 4 wherein said transport means comprises a festooning arrangement for the handling of sheet material, said festooning arrangement being contained within a slidable drawer, said drawer being provided with means for moving said festooning arrangement under said window, said drawer being provided with a front wall, a back wall and a movable cover of sufficient thickness and density to attenuate X-ray created beneath said window to a level below 2.5 millirads per hour.

6. An apparatus for electron irradiation of goods comprising an evacuated chamber having a first end and a second end means affixed to the first end for producing a beam of electrons, in the kev. range or greater, and directing said beam along an axis of said chamber towards said second end, scanner means, in said chamber, for expanding said beam to form an elongated fan-like configuration, base means adapted to receive said chamber, window means disposed in said base and arranged to seal the second end of said chamber when said chamber is disposed in said base, said window means positioned transverse to said elongated beam to permit transmittal of said elongated beam out of said chamber, and transport means, coupled to said base and positioned in line with said chamber, to convey goods transversely through said beam, after said beam passes through said window, said chamber, said base and said transport means being provided with walls of a sufficient density and thickness to attenuate X-radiation, created by said electron beam, to a level below 2.5 millirads per hour, said chamber and each of said means being interlocked to interrupt said beam upon removal of any of said means from said chamber, said transport means comprising a festooning apparatus for the handling of flexible sheet material, said festooning apparatus being contained in a drawer slidable in said base, said drawer being provided with a front and a back of sufficient thickness and density to attenuate X-rays below 2.5 millirads per hour, said base carrying shields adapted to cover the sides of said drawer when said drawer is open, the sides of said drawer being provided with notches adapted to receive a cover provided over said open drawer, said drawer being provided in its bottom with a pair of rollers and narrow slits for the introduction of said sheet material.

7. The apparatus of claim 6 wherein said drawer is provided with a magnetic electron trapping means to prevent the escape of electrons through said slit.

8. An apparatus for electron irradiation of goods comprising an enclosed, evacuated chamber having affixed thereto means for producing a beam of electrons with energies in the kev. range or greater, along an axis of said chamber, scanner means, in said chamber, for expanding said beam to form an elongated fan-like configuration, a beam emitting window means comprising an elongated narrow pane element positioned in a wall of said chamber transverse to said beam to permit transmittal of said beam out of said chamber, and transport means, positioned in line with said chamber, to convey goods, to be irradiated, transversely through said beam after said beam passes through said window, each of said means having integral shielding therewith of sufficient density and thickness to attenuate X-rays created in said means to a level below 2.5 millirads per hour, each of said means being interlocked whereby removal of any of said means interrupts said beam, said transport means comprising a conveyor bearing movable shielding means positioned on said conveyor to permit said goods to pass through said transport means, and under said beam while simultaneously impeding electrons and attenuating X-rays traveling parallel to said transport means, said beam being in continuous operation.

9. An apparatus for electron irradiation of goods comprising an enclosed, evacuated chamber having affixed thereto means for producing a beam of electrons with energies in the kev. range or greater, along an axis of said chamber, scanner means, in said chamber, for expanding said beam to form an elongated fan-like configuration, a beam emitting window means comprising an elongated narrow pane element positioned in a wall of said chamber transverse to said beam to permit transmittal of said beam out off said chamber, and transport means, positioned in line with said chamber, to convey goods, to be irradiated, transversely through said beam after said beam passes through said window, each of said means having integral shielding therewith of sufficient density and thickness to attenuate X-rays created in said means to a level below 2.5 millirads per hour, each of said means being interlocked whereby removal of any of said means interrupts said beam, said transport means comprising a housing having means for the introduction of material to be irradiated in said housing adapted to impede electrons and attenuate X-rays, said housing having an opening therein whereby said beam may enter said housing, offset means disposed beneath said housing, said offset means adapted to impede electrons and attenuate X-rays traveling perpendicular to said beam, and means for engaging and carrying material into said housing past said offset means and under said beam.

References Cited

UNITED STATES PATENTS

| 2,456,816 | 12/1918 | Daly | 250—52 |
| 2,722,620 | 11/1955 | Gale | 250—52 |
| 2,887,584 | 11/1959 | Nygard | 250—52 |

RALPH G. NILSON, *Primary Examiner.*

S. C. SHEAR, *Assistant Examiner.*

U.S. Cl. X.R.

250—52, 108